May 4, 1943.                E. COWLES                2,317,978
                        CONVEYER APPARATUS
                        Filed Dec. 4, 1941            4 Sheets-Sheet 1

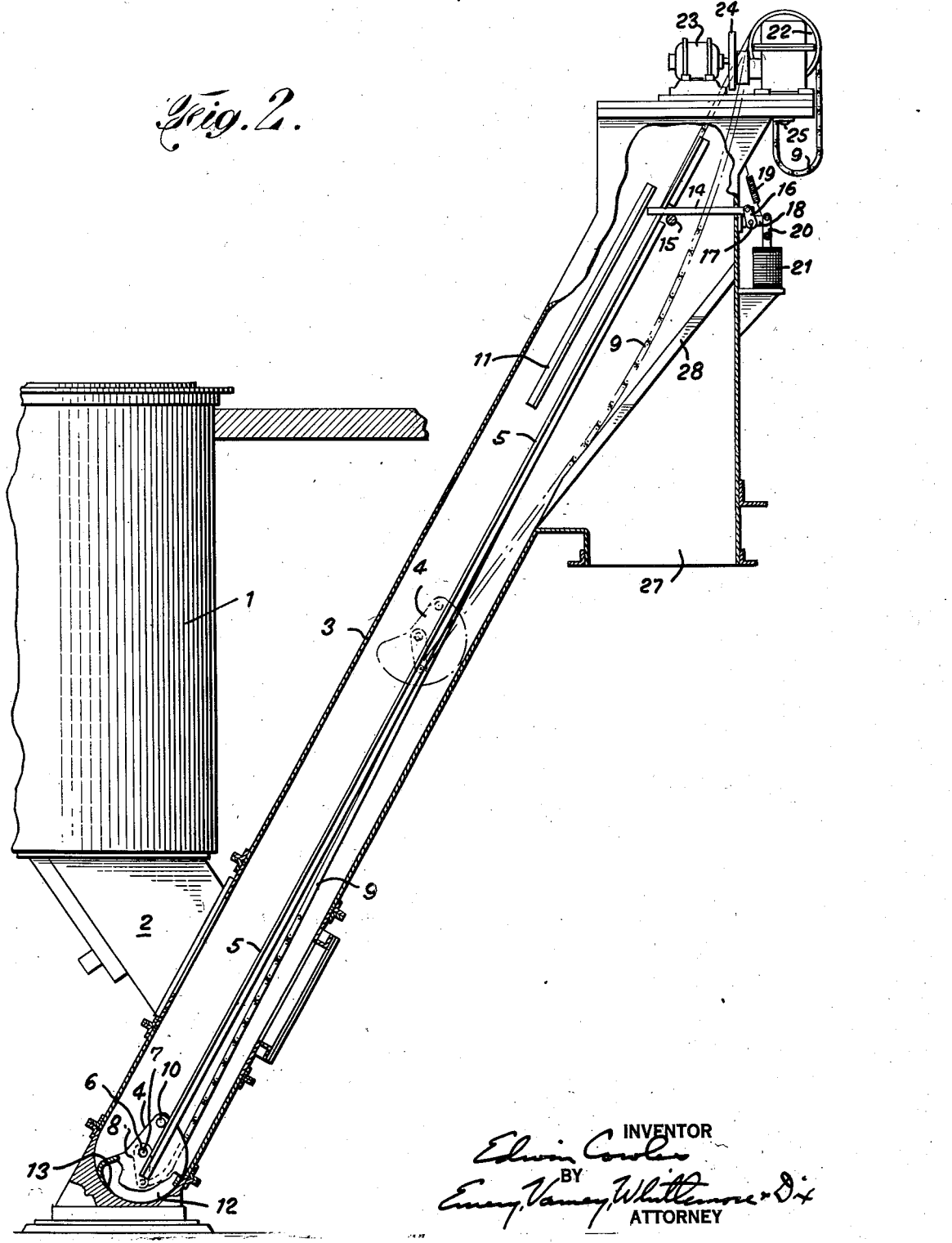

May 4, 1943.  E. COWLES  2,317,978
CONVEYER APPARATUS
Filed Dec. 4, 1941  4 Sheets-Sheet 3
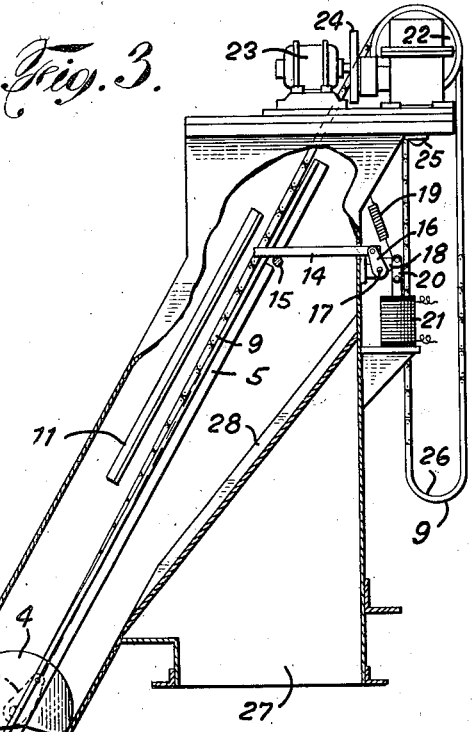
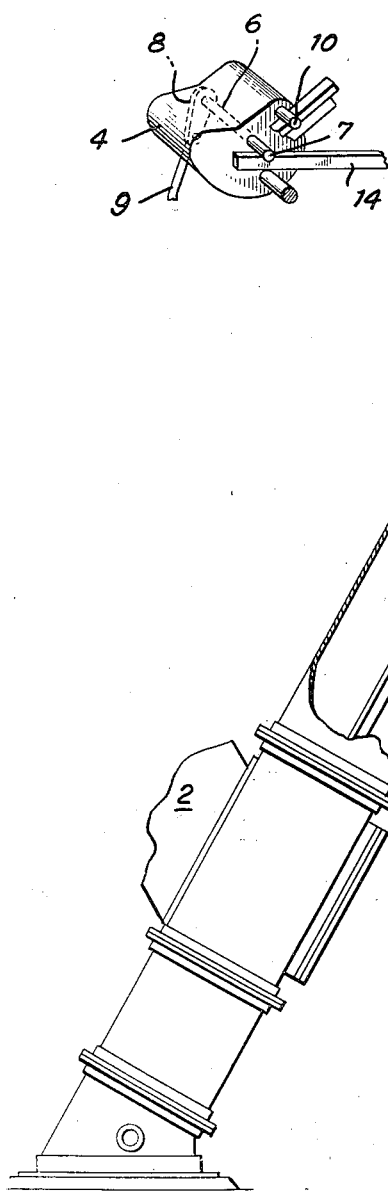
INVENTOR
Edwin Cowles
BY
ATTORNEY May 4, 1943.　　　E. COWLES　　　2,317,978
CONVEYER APPARATUS
Filed Dec. 4, 1941　　　4 Sheets-Sheet 4

INVENTOR
Edwin Cowles
BY
ATTORNEY

Patented May 4, 1943

2,317,978

UNITED STATES PATENT OFFICE 2,317,978

CONVEYER APPARATUS

Edwin Cowles, Cayuga, N. Y., assignor to The Cowles Company, Princeton, N. J., a corporation of New Jersey Application December 4, 1941, Serial No. 421,594

6 Claims. (Cl. 214—103)

This invention relates to conveyer apparatus and is illustrated herein as applied to the removal of trash from paper stock pulping machines. In pulping down waste paper for use in board mills, for example, the bales of waste paper which are defibered in such pulping machines contain large quantities of trash such as glass, stones, metal objects and the like which must be removed from the machine. Bucket conveyers have proved unsatisfactory because the conveyer chains become jammed with pulp. Clam shell buckets have also been used, but require the services of a skilled operator and cannot be satisfactorily operated automatically.

It is an object of the present invention to provide a conveyer apparatus particularly adapted for satisfactory operation in connection with such machines, and also having advantages for general use in connection with similar equipment.

Other objects and advantages of the invention will appear hereinafter.

A preferred embodiment of the invention selected for purposes of illustration is shown in the accompanying drawings, in which, Figure 1 is a side elevation of the apparatus, partly broken away, showing the conveyer bucket in normal starting position as at the beginning of an operating cycle.

Figure 2 is a similar view, showing the conveyer bucket (in dot and dash lines) descending and (in full lines) at the bottom of the chute ready for loading.

Figure 3 is a similar view showing the loaded bucket ascending the chute.

Figure 5 is a detail perspective view of the bucket.

Figure 1:
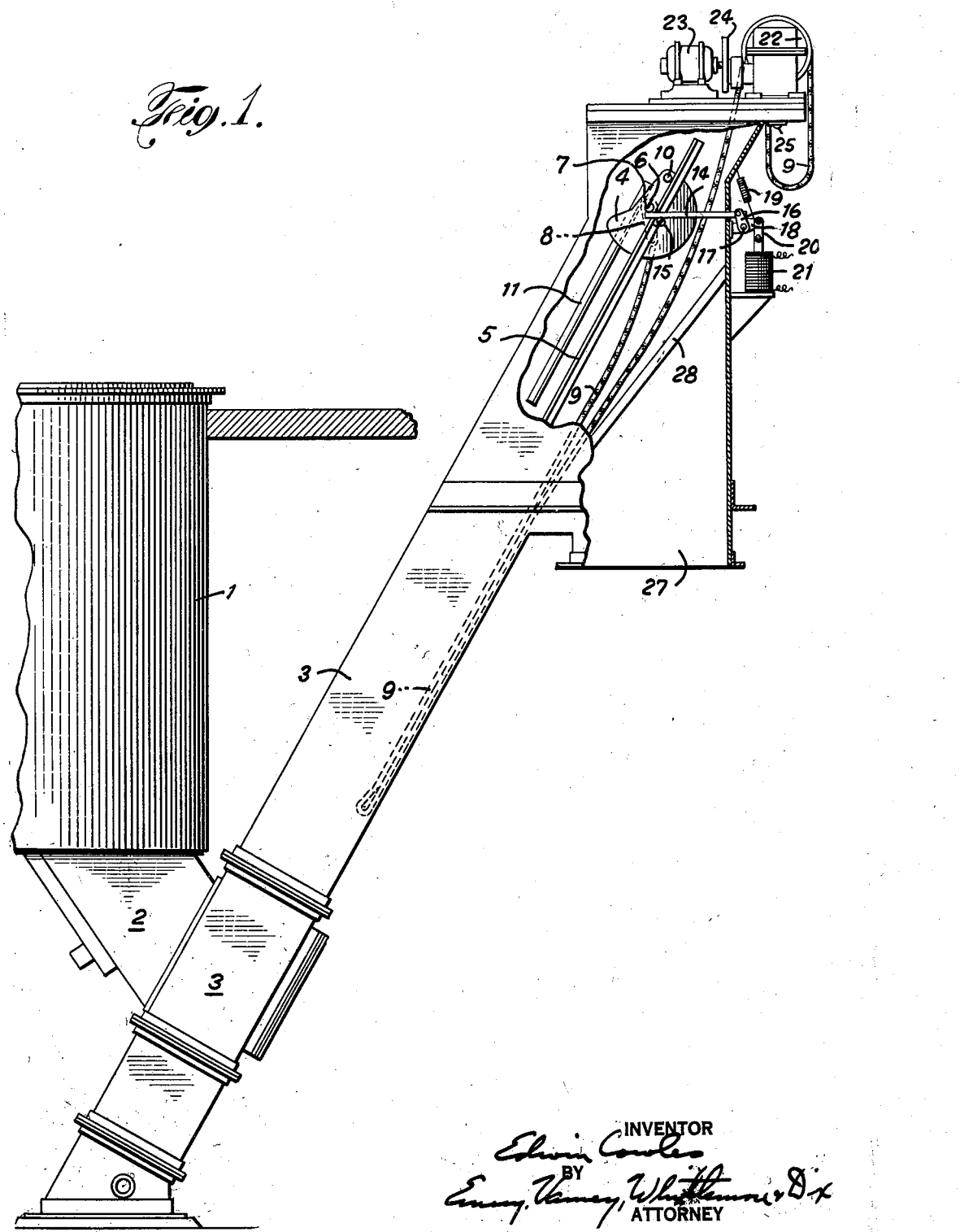
Figure 4:
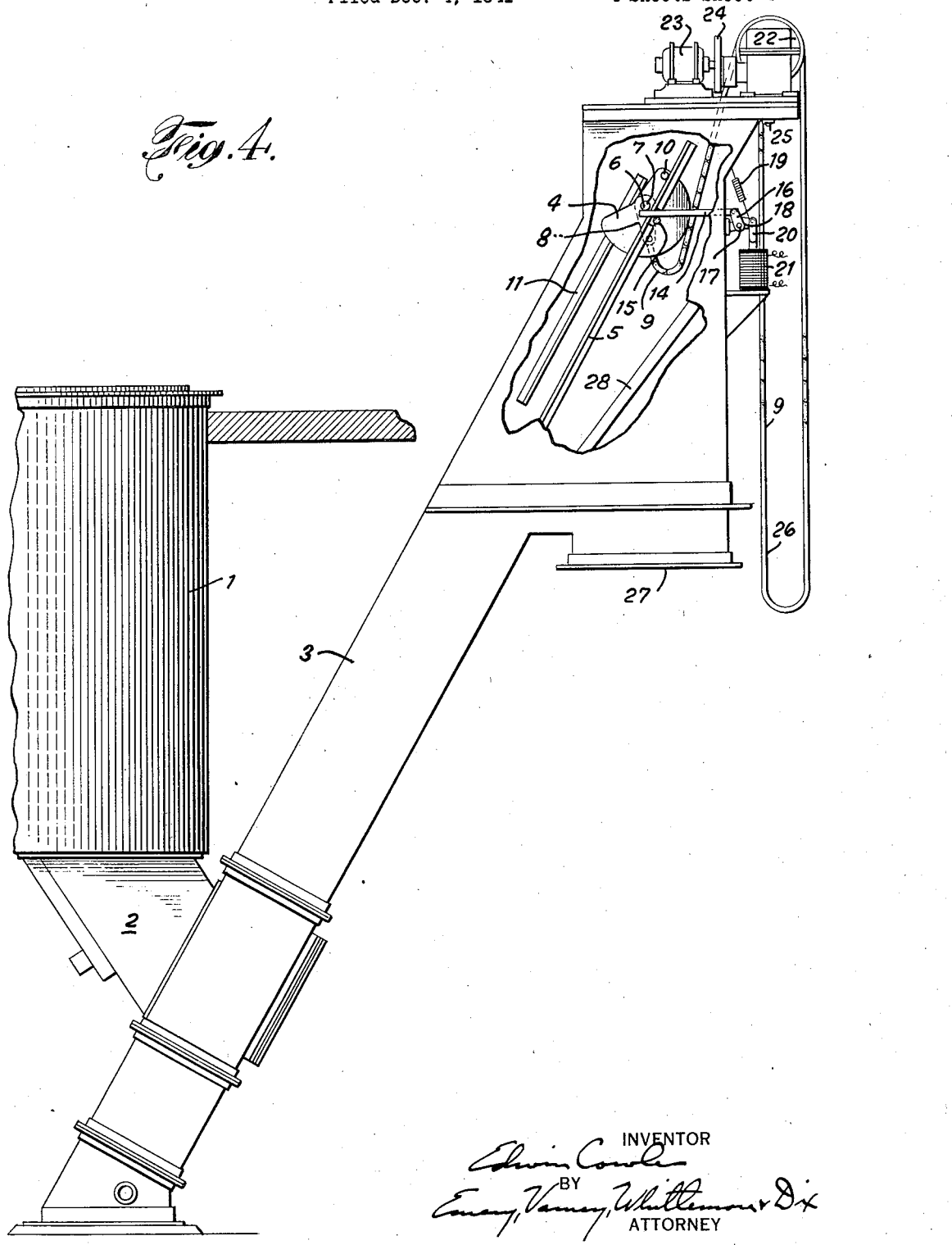
Figure 4 is a similar view showing the bucket in dumping position.

Referring to the drawings, a fragment of the tank 1 of a pulping machine is shown, having an inclined chute 2 discharging into the inclined chute 3 in which the conveyer bucket 4 operates. Thus, trash in the tank 1 drops through the chute 2 into the bottom of the chute 3, from which it is removed by the bucket 4.

Extending longitudinally of the chute 3, are a pair of parallel rails 5, preferably in the form of angle irons welded or otherwise secured to opposite side walls of the chute. A shaft 6 extends transversely across the bucket 4 with the ends of the shaft projecting beyond the end walls of the bucket to provide a pair of trunnions 7 which ride on the rails 5. The shaft 6 carries a lever arm 8 rigidly secured thereto, and the end of the lever arm is secured to one end of an operating chain 9. A second pair of trunnions 10 also projects outwardly from the end walls of the bucket to engage the rails 5 during the downward movement of the bucket, the bucket being unbalanced, or weighted, if desired, to cause it to pivot on the trunnions 7 so that the trunnions 10 are normally held against the rails. If desired, short upper guide rails 11, in the form of angle irons, may also be secured to opposite walls of the chute, extending parallel to the rails 5, to insure that the bucket does not accidentally rotate in counterclockwise direction at the beginning of its downward movement.

The bucket is open on one side only as indicated at 12, Figure 2, the remainder of the bucket being closed by a wall terminating in a scraper lip 13. Thus, when the bucket is in the starting position, as illustrated in Figure 1, and when it is coasting down the chute, as illustrated in dot-dash lines in Figure 2, and when it reaches the bottom of the chute as illustrated in full lines in Figure 2, the open side of the bucket is at the bottom, and the scraper lip 13 is in position to pick up material in the bottom of the chute when the bucket is rotated by applying tension to the chain 9.

Near the upper ends of the rails 5 and extending into the path of one of the trunnions 7 is a latch 14. A similar latch extends into the path of the other trunnion, and these latches are adapted to hold the bucket near the upper limit of its travel. The forward ends of said latches are supported on rollers 15 and the rear ends are connected to the arm 16 of a bell crank pivotally mounted at 17. The other arm 18 of the bell crank is connected to a spring 19, so that in the upward travel of the bucket, the trunnions 7 engage the ends of the latches, pushing the latches back against the tension of the spring 19. As soon as the trunnions pass the latches, the latches move forward into position to support the bucket.

The arm 18 of the bell crank is also connected to a link 20, which in turn is connected to the armature of a solenoid 21, which, when energized, serves to withdraw the latches to allow the bucket to descend.

The cable or chain 9 leads over a drum sprocket or sheave 22 driven by motor 23 through a reduction gear 24, the end of the chain being fastened at any convenient point, as at 25.

The operation of the apparatus is as follows. Starting with the bucket in the elevated position illustrated in Figure 1, and supported on the latches 14, a switch (not shown) is thrown to energize the solenoid 21 to withdraw the latches, thus allowing the bucket to coast down the rails 5, as shown in dot-dash lines in Figure 2 to the position illustrated in full lines in the same figure. Subsequently the motor 23 is started, either by closing another switch, or by means of a relay operated by the first switch. As the chain 9 is pulled taut, the bucket rotates to pick up a load, and thereafter the bucket is elevated as shown in Figure 3, the loose chain being payed out to form a loop 26. When the bucket has been elevated to a position above the latches 14, the motor is reversed in any suitable manner. This reversal lowers the bucket until the trunnions 7 rest on the latches, at which time the bucket, being additionally unbalanced by its load, rotates on the trunnions 7 to the position shown in Figure 5 to discharge its contents through the aperture 27. The reversed operation of the motor then continues to feed the chain back into the chute, to the position shown in Figure 1, the chain being guided and supported meanwhile by the channel 28 extending across the discharge aperture. When the chain reaches the position shown in Figure 1, the motor is stopped in any suitable manner. It will be noted that the single chain 9 serves the double function of lifting the bucket and rotating the bucket to cause it to pick up a load.

It will be apparent that the operation of the motor may be controlled in any desired manner, either manually, or semi-automatically, or fully automatically depending on the use to which the apparatus is to be put. For fully automatic operation a time controlled starting switch may be employed, and the reversing and stopping operations may be effected by limit switches or other devices well known in the electrical art. Since such electrical control devices are known, and form no part of the present invention, they are not illustrated herein.

It will be understood that the invention may be variously modified and embodied within the scope of the subjoined claims.

I claim as my invention:

1. Apparatus of the character described, comprising, in combination, a chute, rails mounted on the interior of said chute, a bucket, trunnions mounted on said bucket adapted to ride on said rails, a latch near the upper end of said rails and adapted to engage said trunnions and support said bucket, said bucket being unbalanced so that when supported by said trunnions on said latch, said bucket tends to rotate to discharge its contents.

2. Apparatus of the character described, comprising, in combination, a chute, rails mounted on the interior of said chute, a bucket, trunnions mounted on said bucket adapted to ride on said rails, a latch near the upper end of said rails and adapted to engage said trunnions and support said bucket, said bucket being unbalanced so that when supported by said trunnions on said latch, said bucket tends to rotate to discharge its contents, and means to withdraw said latch to allow said bucket to coast down said rails.

3. Apparatus of the character described, comprising, in combination, a chute, rails mounted on the interior of said chute, a bucket, trunnions mounted on said bucket adapted to ride on said rails, a latch near the upper end of said rails and adapted to engage said trunnions and support said bucket, said bucket being unbalanced so that when supported by said trunnions on said latch, said bucket tends to rotate to discharge its contents, a hoist chain connected to said bucket, and means to operate said hoist chain to lift said bucket into engagement with said latch, and thereafter to pay out a loose loop of chain.

4. Apparatus of the character described, comprising, in combination, a chute, rails mounted on the interior of said chute, a bucket, trunnions mounted on said bucket adapted to ride on said rails, a latch near the upper end of said rails and adapted to engage said trunnions and support said bucket, said bucket being unbalanced so that when supported by said trunnions on said latch, said bucket tends to rotate to discharge its contents, a hoist chain connected to said bucket, means to operate said hoist chain to lift said bucket into engagement with said latch, and thereafter to pay out a loose lop of chain, and means to release said latch to permit said bucket to coast down said rails without restraint by said chain.

5. Apparatus of the character described, comprising, in combination, an inclined chute, inclined rails mounted on the interior of said chute, a bucket, trunnions mounted on said bucket adapted to ride on said rails, said bucket being open on one side only and being unbalanced so that when supported by said trunnions on said rails the bucket tends to assume a position such that the open side is at the bottom, a lever on said bucket, a hoist chain connected to said lever, and adapted to rotate said bucket to bring the open side to the top and to hoist said bucket up the chute, and a second pair of trunnions on said bucket adapted to engage said rails to limit the turning movement of said bucket in one direction so that said bucket remains in a position such that the open side is at the bottom, said second pair of trunnions serving to hold said bucket in such inverted position during its downward movement along said rails.

6. Apparatus of the character described, comprising, in combination, a chute, rails mounted on the interior of said chute, a bucket, trunnions mounted on said bucket adapted to ride on said rails, said bucket being open on one side only and being unbalanced so that when supported on said trunnions the bucket tends to assume a position such that the open side is at the bottom, a lever on said bucket, a hoist chain connected to said lever, and adapted to rotate said bucket to bring the open side to the top and to hoist said bucket up the chute, a second pair of trunnions on said bucket adapted to engage said rails to limit the turning movement of said bucket in one direction, and guide rails extending parallel to said first named rails, but terminating short of said first named rails at both ends, said guide rails being adapted to engage said last named trunnions during a portion of the travel of said bucket to limit the turning movement of said bucket in the other direction.

EDWIN COWLES.